United States Patent [19]
Behrens et al.

[11] Patent Number: 5,207,244
[45] Date of Patent: May 4, 1993

[54] STEERING CONTROL VALVE WITH CONTOURED CONTROL SURFACES

[75] Inventors: Hermann W. Behrens, Rancho Palos Verdes; George M. Harpole, San Pedro; Jane M. Lin, Rancho Palos Verdes; Michael F. Wolff, Torrance, all of Calif.

[73] Assignee: TRW Inc., Lyndhurst, Ohio

[21] Appl. No.: 948,025

[22] Filed: Sep. 21, 1992

[51] Int. Cl.⁵ .............................................. F15B 9/10
[52] U.S. Cl. .......................... 137/625.24; 137/625.21; 91/375 A
[58] Field of Search .............. 91/375 A; 137/625.21, 137/625.24

[56] References Cited

U.S. PATENT DOCUMENTS

| | | | |
|---|---|---|---|
| 3,022,772 | 2/1962 | Zeigler et al. | 121/41 |
| 4,300,594 | 11/1981 | Bacardit | 137/625.21 |
| 4,335,749 | 6/1982 | Wolfgang | 137/625.22 |
| 4,445,422 | 5/1984 | Bishop | 137/625.24 |
| 4,460,016 | 7/1984 | Kyosuke et al. | 137/625.24 |
| 4,471,808 | 9/1984 | Thomsen et al. | 251/209 |
| 4,577,660 | 3/1986 | Haga et al. | 91/375 A |
| 4,579,040 | 4/1986 | Masuda et al. | 137/625.24 |
| 4,705,132 | 11/1987 | Tasuchiya | 91/375 A |
| 4,771,841 | 9/1988 | Uchida et al. | 180/142 |
| 4,779,646 | 10/1988 | Vincent | 137/625.24 |
| 4,852,462 | 8/1989 | Uchida et al. | 91/375 A |
| 4,924,910 | 5/1990 | Tabata et al. | 137/625.23 |
| 5,133,384 | 7/1992 | Tabata et al. | 91/375 A |

*Primary Examiner*—A. Michael Chambers
*Attorney, Agent, or Firm*—Tarolli, Sundheim & Covell

[57] ABSTRACT

A valve for controlling flow of hydraulic fluid. The valve includes a valve sleeve and a valve core. The core is disposed within the sleeve. The core and sleeve are relatively rotatable. The sleeve has grooves connected to a utilization device. The core has grooves connected to a fluid supply and reservoir. The core and sleeve have lands which radially overlap during relative rotation of said core and sleeve to restrict fluid flow from a portion of the grooves in the sleeve to the grooves in the core connected to the reservoir. The lands on the sleeve have chamfered end faces with tapered segments.

10 Claims, 3 Drawing Sheets

STEERING CONTROL VALVE WITH CONTOURED CONTROL SURFACES

BACKGROUND OF THE INVENTION

The present invention relates to a rotary valve for controlling flow of hydraulic fluid. The valve is used to control the flow of hydraulic fluid to a power steering motor. A known power steering control valve for controlling flow of hydraulic fluid to a power steering motor includes a valve sleeve having a generally cylindrical bore therein and a generally cylindrical valve core rotatably mounted therein. Each of the core and sleeve has a plurality of lands and grooves that cooperate to regulate pressure and control flow between a hydraulic pump and a steering assist motor.

When the spool and sleeve are in a neutral position fluid is communicated generally equally to opposite chambers of the power steering motor. When the core and sleeve are relatively rotated from the neutral position, fluid flow is variably restricted. Restriction of the fluid flow causes pressurized fluid to be delivered to one of the opposite chambers of the power steering motor to cause motor actuation.

The restriction is provided by cooperation of lands on the core and sleeve which define variable flow areas or orifices. Variation in the size of a flow area, and thus the amount of restriction, is provided by end surface segments of the lands on the core and sleeve. Relative rotation between the core and sleeve cause the end surface segments to be positioned at varying distances apart. Due to a high volume of hydraulic fluid flow from a fixed displacement pump and pressure changes (drops) as the hydraulic fluid flows through the flow areas, various hydraulic noise is generated. The hydraulic noise includes noise due to cavitation of hydraulic fluid flowing through a gradually expanding flow path.

SUMMARY OF THE INVENTION

The present invention is directed to an improved valve for controlling flow of hydraulic fluid in a hydraulic steering gear. The valve includes a valve sleeve which has a cylindrical bore and defines a longitudinal axis. The valve sleeve has first and second axially extending grooves connected to opposite ends of a hydraulic motor. The valve sleeve has an axially extending land disposed between the first and second grooves. The valve includes a generally cylindrical valve core which has a longitudinal axis common with the axis of the valve sleeve. The valve core is disposed within the valve sleeve. The valve core has third and fourth axially extending grooves connected to a fluid supply and a fifth axially extending groove connected to reservoir. The valve core and the valve sleeve are relatively rotatable about the common axis.

The core and sleeve have surfaces which define a first fluid passage connecting the first and fifth grooves and surfaces which define a second fluid passage connecting the second and fourth grooves upon relative rotation of the core and sleeve in one direction. The core and sleeve also have surfaces which define a third fluid passage connecting the second and fifth grooves and surfaces which define a fourth fluid passage connecting the first and third grooves upon relative rotation of the core and sleeve in another direction. The surfaces defining the first fluid passage include a first axially extending surface segment on the sleeve which tapers radially inwardly from the first groove and a second axially extending surface segment on the core which terminates at an edge adjacent the fifth groove and which partially defines a first land corner. The first surface segment and the edge of the second surface segment define a minimum cross-sectional flow area of the first fluid passage located immediately adjacent the fifth groove. The minimum cross-sectional flow area constantly varies as the core and sleeve relatively rotate.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein.

DESCRIPTION OF PREFERRED EMBODIMENT

Figure 1:
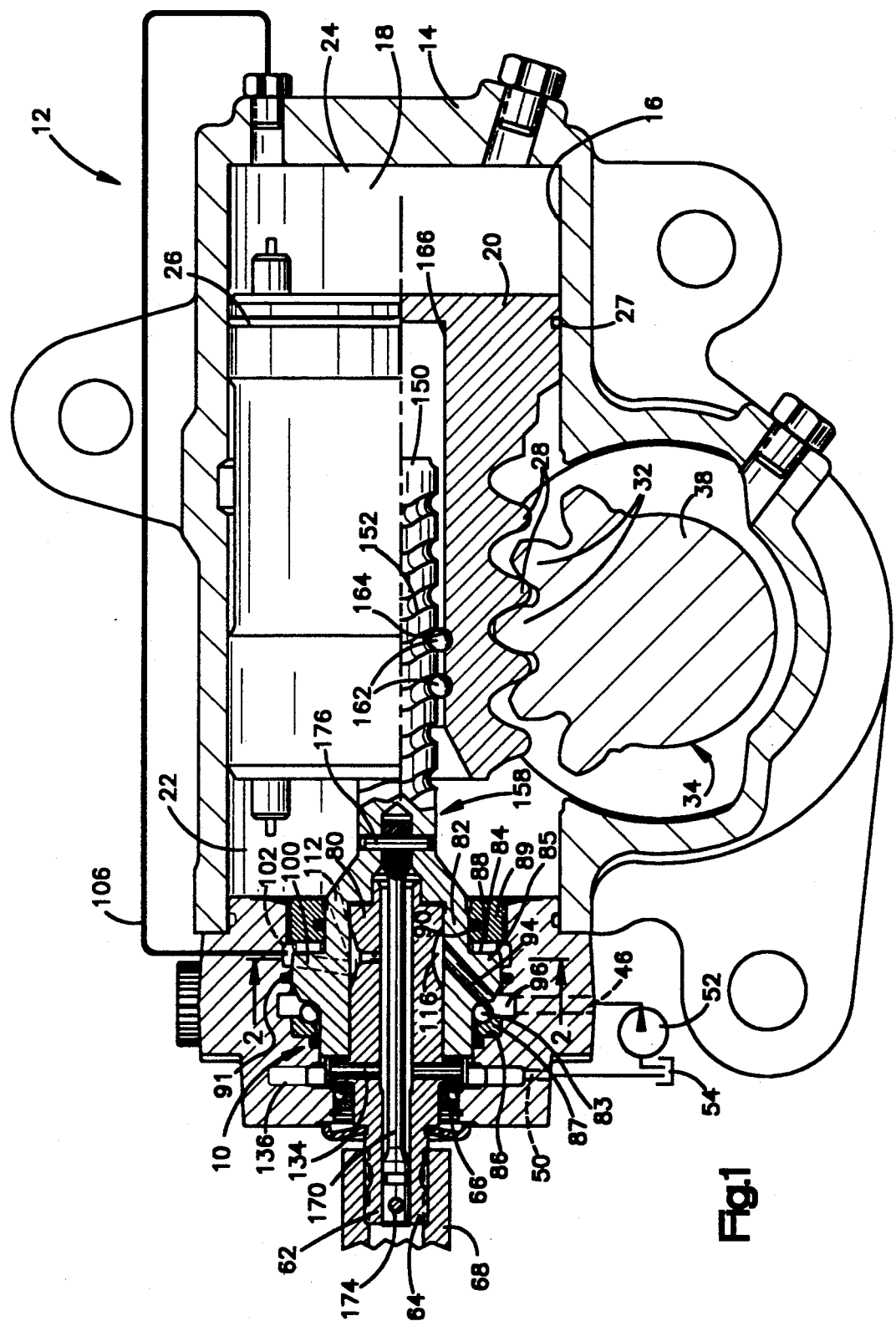
FIG. 1 is a longitudinal cross-sectional view of a power steering gear with a valve which embodies the present invention.

The fluid control valve (FIG. 1) of the present invention may be used to control fluid flow associated with mechanisms of a variety of constructions and uses. Preferably, the control valve 10 is utilized in a power steering gear 12 for turning dirigible wheels (not shown) of a vehicle (not shown) in opposite directions to effect steering of the vehicle. The preferred power steering gear is a model TAS Integral Power Steering Gear manufactured and marketed by TRW Inc., Ross Gear Division of Lafayette, Ind., and identified as TAS40, TAS55 or TAS65. The power steering gear 12 includes a housing 14 having an inner cylindrical surface 16 defining a chamber 18. A piston 20 divides the chamber 18 into opposite chamber portions 22 and 24 located at opposite ends of the piston 20. An O-ring 26 carried in a groove 27 in the piston 20 provides a fluid seal between the chamber portions 22 and 24.

A series of rack teeth 28 are formed on the periphery of the piston 20. The rack teeth 28 mesh with teeth 32 formed on a sector gear 34. The sector gear 34 is fixed on an output shaft 38 which extends outwardly from the steering gear 12 through an opening (not shown) in the housing 14. The output shaft 38 is typically connected to a Pitman arm (not shown) which in turn is connected to a mechanical steering linkage (not shown) of the vehicle. Thus, as the piston 20 moves in the chamber 18, the sector gear 34 and output shaft 38 are rotated to operate the steering linkage as will be understood by those skilled in the art.

The housing 14 includes a fluid inlet port 46 and a fluid return port 50. The inlet port 46 and return port 50 are adapted to be connected in fluid communication with hydraulic circuitry (schematically illustrated) including a power steering pump 52 and a fluid reservoir 54. The control valve 10 is operable to direct pressurized fluid from the inlet port 46 to one of the chamber portions 22 and 24. Fluid from the other of the chamber portions 22 and 24 is simultaneously directed by the control valve 10 to the return port 50 which is connected with the power steering pump fluid reservoir 54. The control valve 10 is actuated by a manually rotatable shaft 62. The shaft 62 is supported for rotation relative to the housing 14 via bearing member 66. An outer end portion 64 of the shaft 62 is splined for receiving a portion of a shaft 68 thereon. The shaft 68 is connected with a steering wheel (not shown) which is manually turned by the operator of the vehicle to effect steering of the vehicle.

Figure 2:
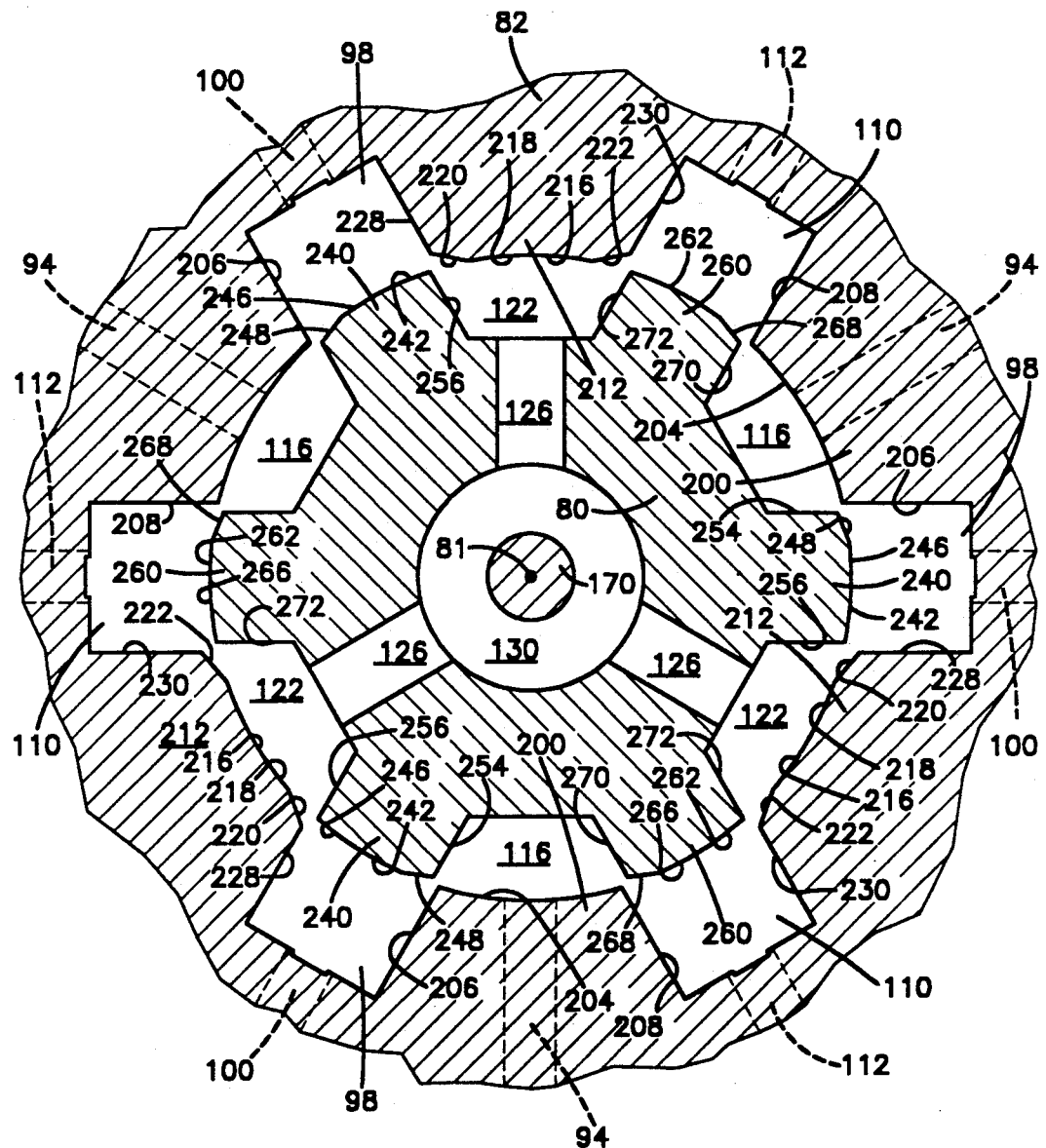
FIG. 2 is a partial cross-sectional view of the valve taken approximately along line 2—2 of FIG. 1.

The control valve 10 includes a valve core part 80 and a valve sleeve part 82. The valve core part 80 is located coaxially within the valve sleeve part 82. The valve core part 80 is rotatable relative to the valve sleeve part 82 about a common axis 81 (FIG. 2). The valve sleeve part 82 (FIG. 1) is supported for rotation by bearings 83 and 84 located between the valve sleeve part 82 and the housing 14. The bearing 83 is located between an annular projecting portion 85 of the valve sleeve part 82 and a radial wall 86 of the housing 14. Also, a seal ring 87 is located between the outer surface of the valve sleeve part 82 and the housing 14.

The bearing 84 is a thrust bearing and is located between a radial surface 88 of the annular projecting portion 85 of the valve sleeve part 82 and a retaining nut 89. The nut 89 is threaded into the housing 14 and holds the control valve 10 in position in the housing 14. A seal ring 90 is located between the nut 89 and an outer surface of the valve sleeve part 82. Another seal 91 is disposed in a groove in the housing 14.

The valve sleeve part 82 (FIG. 2) has three radially directed passages 94 extending from its outer circumference to its inner circumference. The passages 94 are spaced 120° apart about the valve sleeve 82. The passages 94 communicate with an annulus 96 (FIG. 1) in the housing 14. The annulus 96, in turn, is connected with the inlet port 46, and is thus subjected to the fluid pressure from the power steering pump 52.

The valve sleeve part 82 has on its inner surface three axially extending grooves 98 (FIG. 2). The three grooves 98 are equally spaced around the inner surface of the valve sleeve part 82. Each of the grooves 98 communicate with a respective radially extending passage 100. The passages 100 are spaced 120° apart about the valve sleeve part 82. The passages 100 (FIG. 1 shows only one passage 100, in phantom) communicate with an annulus 102 in the housing 14. The annulus 102 communicates with a suitable housing passage 106 which, in turn, communicates with the chamber portion 24.

The valve sleeve part 82 (FIG. 2) includes three axially extending grooves 110 on the inner surface thereof. The grooves 110 are equally spaced about the inner surface of the valve sleeve part 82. Each of the grooves 110 communicate with a respective passage 112. The passages 112 are spaced 120° apart about the valve sleeve part 82. The passages 112 (FIG. 1 shows only one passage 112, in phantom) communicate with the chamber portion 22.

The valve core part 80 has an elongated cylindrical configuration and is integrally formed as one piece with the shaft 62. The valve core part 80 has three axially extending grooves 116 (FIG. 2) in its outer circumference. The grooves 116 are spaced 120° apart about the outer circumference of the valve core part 80 and communicate with the passages 94 in the valve sleeve part 82. The extent of the grooves 116 around the outer circumference of the valve core part 80 is such that each of the grooves 116 communicates equally with respective grooves 98 and 110 when the valve core part 80 is in a centered or neutral position relative to the valve sleeve part 82 (as shown in FIG. 2).

Also equally spaced about the outer circumference of the valve core part 80 and located intermediate the grooves 116 are axially extending grooves 122. The extent of the grooves 122 around the outer circumference of the valve core part 80 is such that each of the grooves 122 communicates equally with respective grooves 98 and 110 when the valve core part 80 is in the centered or neutral position. Each of the grooves 122 communicate with a respective passage 126 which extends from each groove 122 into an internal passage 130 of the valve core part 80. The internal passage 130 of the valve core part 80 also communicates with a plurality (four) of radially extending passages 134 (FIG. 1) which extend through the valve core part 80. The radially extending passages 134 communicate with an annulus 136 in the housing 14. The annulus 136, in turn, communicates with the return port 50 in the housing 14.

The valve sleeve part 82 of the steering gear 12 is integrally formed with a follow-up member 150 which has a screw thread portion 152 formed in its outer periphery. The valve sleeve part 82 and the follow-up member 150 form an integral one-piece unit 158. A plurality of balls 162 are located in the screw thread portion 152. The balls 162 are also located in an internally threaded portion 164 formed in a bore 166 of the piston 20. Axial movement of the piston 20 corresponds to rotation of the follow-up member 150, as is known.

A torsion spring 170 is connected between the input shaft 62 and the follow-up member 150 by pins 174 and 176, respectively. During a steering maneuver, the valve core part 80 is rotated relative to the valve sleeve part 82, away from the neutral position, as is known. Thus, when the valve core part 80 is rotated relative to the valve sleeve part 82, the piston 20 moves axially. When the steering maneuver is terminated, the one-piece unit 158, and thus the valve sleeve part 82, will rotate relative to the valve core part 80 and return the valve parts 80 and 82 to the neutral position via the bias of the torsion spring 170.

The valve sleeve part 82 of the control valve 10 includes three axially extending lands 200 (FIG. 2) positioned radially opposite the grooves 116 of the valve core part 80. The lands 200 each include an axially extending end face surface 204. The end face surfaces 204 have relatively sharp terminus edges adjacent the grooves 98 and 110, which partially define land corners. Each of the end face surfaces 204 lie in an arc extending at a radius from the common axis 81.

An associated one of the passages 94 extends through each land 200 and through each end face surface 204 to communicate with a respective one of the grooves 116. Each of the lands 200 includes an axially and radially extending side surface 206 which partially defines a respective one of the grooves 98. Each of the lands 200 includes an axially and radially extending side face surface 208 which partially defines a respective one of the grooves 110.

The valve sleeve part 82 includes three axially extending lands 212 positioned radially opposite the grooves 122 of the valve core part 180. The lands 212 each include axially extending end face surfaces 216. Each of the end face surfaces 216 includes an axially extending portion 218 which lies in an arc extending at a radius from the common axis 81. Each of the end face surfaces 216 includes axially extending chamfered portions 220 and 222.

Each of the chamfered portions 220 is positioned between a respective one of the grooves 98 and a respective one of the portions 218. Each of the chamfered portions 220 tapers radially inwardly as the chamfered portion 220 extends from the respective one of the grooves 98 to the respective one of the portions 218. Each of the chamfered portions 222 is positioned between a respective one of the grooves 110 and a respective one of the portions 218. Each of the chamfered portions 222 tapers radially inwardly as the chamfered portion 220 extends from the respective one of the grooves 110 to the respective one of the portions 218. The lands 212 each include axially and radially extending side face surfaces 228 and 230. The side face surfaces 228 and 230 partially define the grooves 98 and 110, respectively.

The valve core part 80 includes three axially extending lands 240. The lands 240 are positioned radially opposite the grooves 98. Each of the lands 240 has an axially extending end face surface 242. Each of the end face surfaces 242 includes an axially extending portion 246 which lies in an arc extending at a radius from the common axis 81. The portions 246 have relatively sharp terminus edges adjacent the grooves 122, which partially define land corners.

Each of the end face surfaces 242 includes an axially extending chamfered portions 248. Each of the chamfered portions 248 is positioned between a respective on of the grooves 116 and a respective one of the portions 246. Each of the chamfered portions 248 tapers radially inwardly as the chamfered portion 248 extends from the respective one of the portions 246 to the respective one of the grooves 116. Each of the lands 240 has an axially and radially extending side face surface 254 which partially defines a respective one of the grooves 116. Each of the lands 240 includes an axially and radially extending side face surface 256 which partially defines a respective one of the grooves 122.

The valve core part 80 includes three axially extending lands 260. The lands 260 are positioned radially opposite the grooves 110. Each of the lands 260 has an axially extending end face surface 262. Each of the end face surfaces 262 includes an axially extending portion 266 which lies in an arc extending at a radius from the common axis 81. The portions 266 have relatively sharp terminus edges adjacent the groove 122, which partially define land corners.

Each of the end face surfaces 262 includes an axially extending chamfered portion 268. Each of the chamfered portions 268 is positioned between a respective one of the grooves 116 and a respective one of the portions 266. Each of the chamfered portions 268 tapers radially inwardly as the chamfered portion 268 extends from the respective one of the portions 266 to the respective one of the grooves 116. Each of the lands 260 includes an axially and radially extending side face surface 270 which partially defines a respective one of the grooves 116. Each of the lands 260 includes an axially and radially extending side face surface 272 which partially defines a respective one of the grooves 122.

In operation, the amount of fluid flow from the grooves 116 to either the grooves 98 or 110 is dependent upon the proximity of either the lands 240 or 260 to the lands 200, due to relative rotation between the valve core part 80 and the valve sleeve part 82. Further, the amount of fluid flow from either the grooves 98 or 110 to the grooves 122 is dependent upon the proximity of either lands 240 or lands 260 to the lands 212, due to relative rotation between the valve core part 80 to the valve sleeve part 82.

In the neutral position (FIG. 2) the lands 240 and the lands 260 are spaced at equal distances from the lands 200. Substantially equal amounts of pressurized hydraulic fluid flows from the grooves 116 into both the grooves 98 and the grooves 110. Also, in the neutral position, the lands 240 and the lands 260 are spaced at substantially equal distances from the lands 212. Substantially equal amounts of hydraulic fluid flows from the grooves 98 and 110 into the grooves 122. Thus, in the neutral position, the pressures in the chambers 22 and 24 (FIG. 1) are substantially equal. Therefore, the piston 20 is not moved within the chamber 18.

Figure 3:
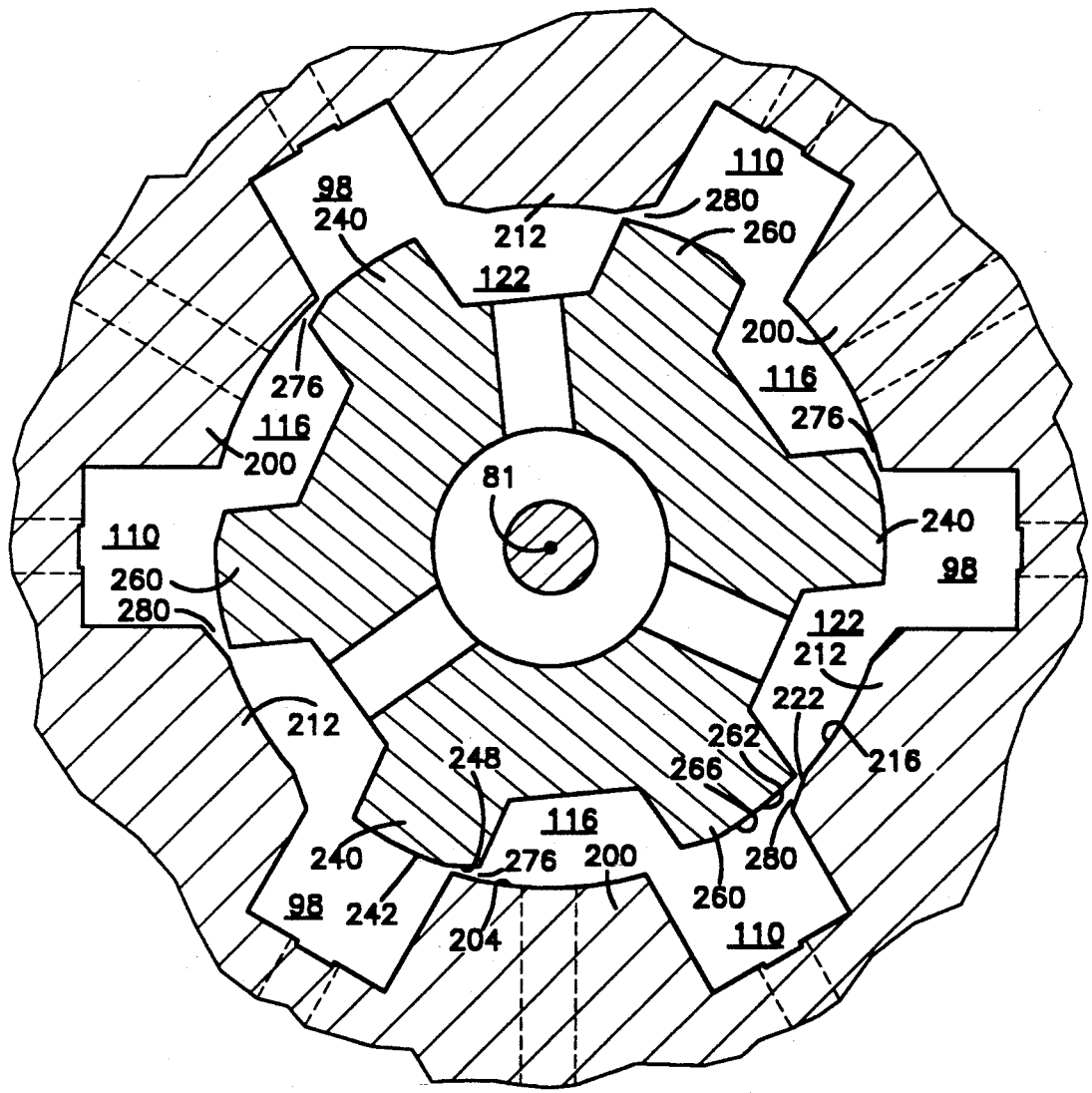
FIG. 3 is a partial cross-sectional view generally similar to FIG. 2, with valve members relatively rotated.

Upon rotation of the steering wheel, the valve core part 80 is rotated relative to the valve sleeve part 82, away from the neutral position. Upon rotation of the valve core part 80 in a first direction (counterclockwise as shown in FIG. 3) relative to the valve sleeve part 82, the lands 240 partially radially overlap the lands 200 and the lands 260 partially radially overlap the lands 212. The overlapping lands 240 and 200 create flow passages 276 for hydraulic fluid flowing from the grooves 116 to the grooves 98. The overlapping lands 260 and 212 create flow passages 280 for hydraulic fluid flowing from the groove 110 to the grooves 122. The overlapping lands 240 and 200 and the overlapping lands 260 and 212 decrease the flow area and increase the restriction to flow of hydraulic fluid.

Simultaneously, in the relatively rotated position, the lands 260 are spaced a greater distance from the lands 200 and the lands 240 are spaced a greater distance from the lands 212 than in the neutral position. The spacing of the lands 260 relative to the lands 200 and the spacing of the lands 240 relative to the lands 212 increase the area available for fluid flow and reduce the restriction to flow of hydraulic fluid.

Each flow passage 276 has a cross-sectional area defined by the end face surface 204 of a respective one of the lands 200 and the chamfered portion 248 of the end face surface 242 on a respective one of the lands 240. The cross-sectional area of each flow passage 276 for flow of hydraulic fluid from the grooves 116 to the grooves 98 gradually decreases to a minimum cross-sectional area immediately adjacent to the groove 98. The minimum cross-sectional area is defined by the terminus edge of the end face surface 204 and the chamfered portion 248 of the end face surface 242.

Each flow passage 280 has a cross-sectional area defined by the portion 266 of the end face surface 262 on a respective one of the lands 260 and the chamfered portion 222 of the end surface 216 on a respective one of the lands 212. The cross-sectional area of each flow passage 280 for flow of hydraulic fluid from the grooves 110 to the grooves 122 gradually decreases to a minimum cross-sectional area immediately adjacent to the groove 122. The minimum cross-sectional area is defined by the terminus edge of the portion 266 of the end face surface 262 and the chamfered portion 222 of the end face surface 216. Pressurized hydraulic fluid from the fluid supply pump 52 (FIG. 1) is directed into the chamber 22. Hydraulic fluid from the chamber 24 is vented to the reservoir 54.

Upon rotation of the valve core part 80 in a second direction (clockwise, not shown) relative to the valve sleeve part 82, there is a corollary restriction of flow of hydraulic fluid between the grooves 116 and 110 and between the grooves 98 and 122. With the valve core part 80 and the valve sleeve part 82 in such a relative rotated position, the lands 260 radially overlap the lands 200 and the lands 240 radially overlap the lands 212. Thus, associated flow passages are established between the lands 200 and 260 and the lands 212 and 240. The flow of hydraulic fluid from the grooves 116 to the grooves 110 is restricted. Also, the flow of hydraulic fluid from the grooves 98 to the grooves 122 is restricted. Thus, fluid pressure is increased by actuation of the pump 52 and pressurized hydraulic fluid from the fluid supply pump 52 (FIG. 1) is directed into the chamber 24. Hydraulic fluid from the chamber 22 is vented to the reservoir 54.

From the above description of the invention, those skilled in the art will perceive improvements, changes and modifications. Such improvements, changes and modifications within the skill of the art are intended to be covered by the appended claims.

Having described the invention, the following is claimed:

1. A valve for controlling flow of pressurized hydraulic fluid, said valve comprising:

a valve sleeve having a longitudinal axis and a cylindrical bore, said sleeve defining first and second axially extending grooves connected to opposite ends of a hydraulic motor, said sleeve having an axially extending land disposed between said first and second grooves; and a valve core having a longitudinal axis common with the axis of said valve sleeve and being disposed within the bore in said sleeve, said valve core having a third axially extending groove connected to a fluid supply and a fourth axially extending groove connected to a fluid reservoir, said core and sleeve being relatively rotatable about the common axis;

said core and sleeve having surfaces defining a first fluid passage connecting said first and fourth grooves and having surfaces defining a second fluid passage connecting said second and third grooves upon relative rotation of said core and sleeve in one direction;

said surfaces defining the first fluid passage including a first axially extending surface segment on said land of said sleeve which tapers radially inwardly from said first groove and a second axially extending surface segment on said core which terminates at an edge adjacent said fourth groove, said first surface segment and said edge of said second surface segment defining a minimum cross-sectional flow area of the first fluid passage located immediately adjacent said fourth groove to reduce noise of flowing hydraulic fluid, the minimum cross-sectional area of the first fluid passage constantly varying as said core and sleeve relatively rotate.

2. A valve as set forth in claim 1, wherein said second surface segment lies in an arc extending at a radius from the common axis.

3. A valve as set forth in claim 1, wherein said surfaces defining the second fluid passage include a third axially extending surface segment on said core which tapers radially inwardly toward said third groove and a fourth axially extending surface segment on said sleeve which terminates at an edge adjacent said second groove said third surface segment and said edge of said fourth surface segment defining a minimum cross-sectional flow area of the second fluid passage located immediately adjacent said second groove, the minimum cross-sectional area of the second fluid passage constantly varying as said core and sleeve relatively rotate.

4. A valve as set forth in claim 3, wherein said fourth surface segment lies in an arc extending at a radius from the common axis.

5. A valve as set forth in claim 3, wherein said core having a fifth axially extending groove connected to the fluid supply, said core and sleeve having surfaces defining a third fluid passage connecting said second and fourth grooves and having surfaces defining a fourth fluid passage connecting said first and fifth grooves upon relative rotation of said core and sleeve in another direction, said surfaces defining the third flow passage include a fifth axially extending surface segment on said land of said sleeve which tapers radially inwardly from said second groove and a sixth axially extending surface segment on said core which terminates at an edge adjacent said fourth groove, said fifth surface segment and said edge of said sixth surface segment defining a minimum cross-sectional flow area of the third flow passage located immediately adjacent said fourth groove to reduce noise of flowing hydraulic fluid, the minimum cross-sectional area of the third flow passage constantly varies as said core and sleeve relatively rotate.

6. A valve as set forth in claim 5, wherein said sixth surface segment lies in an arc extending at a radius from the common axis.

7. A valve as set forth in claim 5, wherein said surfaces defining the fourth flow passage include a seventh axially extending surface segment on said core which tapers radially inwardly toward said fifth groove and an eighth axially extending surface segment on said sleeve which terminates at an edge adjacent said first groove, said seventh surface segment and said edge of said eighth surface segment defining a minimum cross-sectional flow area of the fourth fluid passage located immediately adjacent said first groove, the minimum cross-sectional area of the fourth fluid passage constantly varying as said core and sleeve relatively rotate.

8. A valve as set forth in claim 7, wherein said eighth surface segment lies in an arc extending at a radius from the common axis.

9. A valve for controlling flow of hydraulic fluid, said valve comprising:

a valve sleeve having a longitudinal axis and a hollow interior, said sleeve having first and second groove means; and a valve core having a longitudinal axis common with the axis of said sleeve and being disposed within the interior of said sleeve, said core having third and fourth groove means, said core and sleeve being relatively rotatable about a common axis;

said first groove means being connected to a first port of a utilization device, said second groove means being connected to a second port of the utilization device, said third groove means being connected to a fluid supply, said fourth groove being connected to reservoir;

said core and sleeve having first land means which restrict fluid flow from said third groove means to said first groove means upon relative rotation of said core and sleeve in one direction and from said third groove means to said second groove means upon relative rotation of said core and sleeve in a second direction, said core and sleeve having second land means which restrict fluid flow from said second groove means to said fourth groove means upon relative rotation of said core and sleeve in said one direction and from said first groove means to said fourth groove means upon relative rotation of said core and sleeve in the second direction;

said first land means including axially extending surface segments on said core and sleeve which radially overlap for a range of relative rotational positions of said core and sleeve, said surface segments of said first land means defining a flow passage with a minimum flow area which constantly varies as said core and sleeve relatively rotate, said surface segment of said first land means on said core tapering radially inwardly toward said third groove means;

said second land means including axially extending surface segments on said core and sleeve which radially overlap for a range of relative rotational positions of said core and sleeve, said surface segments of said second land means defining a flow passage with a minimum flow area which constantly varies as said core and sleeve relatively rotate, said surface segment of said second land means on said sleeve tapering radially inwardly from one of said first and second groove means to provide an abruptly expanding flow area immediately downstream of the minimum flow area of the flow gap defined by said surface segments of said second land means to reduce noise of flowing hydraulic fluid.

10. A valve as set forth in claim 9, wherein said first groove means includes three axially extending grooves located at equidistant spacings within said sleeve, said second groove means includes three axially extending grooves located at equidistantly spacings within said sleeve and interposed between said three grooves of said first groove means, said third groove means includes three axially extending grooves located at equidistant spacings about said core, said fourth groove means includes three axially extending grooves located at equidistant spacings about said core and interposed between said three grooves of said third groove means.

* * * * *